United States Patent [19]

Maass et al.

[11] Patent Number: 5,253,453
[45] Date of Patent: Oct. 19, 1993

[54] SEALING ARRANGEMENTS

[75] Inventors: Klaus P. Maass; Peter Frommen, both of Viersen, Fed. Rep. of Germany

[73] Assignee: Draftex Industries Limited, Edinburgh, Scotland

[21] Appl. No.: 792,014

[22] Filed: Nov. 13, 1991

[30] Foreign Application Priority Data

Dec. 12, 1990 [GB] United Kingdom ............ 9026961.4
Dec. 18, 1990 [GB] United Kingdom ............ 9027383.0

[51] Int. Cl.⁵ .............................................. E05F 11/38
[52] U.S. Cl. ...................... 49/377; 49/477.1; 15/250.10
[58] Field of Search ............ 15/250.1, 250.01, 250.02, 15/250.03, 250.04; 49/475, 477, 480, 481, 490, 491, 374, 377

[56] References Cited

U.S. PATENT DOCUMENTS

| | | |
|---|---|---|
| 2,530,160 | 11/1950 | Finley . |
| 3,452,384 | 7/1969 | Scinta . |
| 3,548,440 | 12/1970 | Kothari ................ 15/250.10 X |
| 3,548,441 | 12/1970 | Kruger ................ 15/250.10 X |
| 3,686,705 | 8/1972 | Parker et al. .......... 15/250.10 X |
| 3,849,827 | 11/1974 | Goropolis et al. ...... 15/250.10 X |
| 4,105,248 | 8/1978 | Lake . |
| 4,472,469 | 9/1984 | Thies ..................... 49/490 X |
| 4,813,184 | 3/1989 | Weimar .................. 49/477 |
| 4,976,067 | 12/1990 | Maass ..................... 49/477 X |
| 5,010,689 | 4/1991 | Vaughan .................. 49/490 X |
| 5,085,005 | 7/1992 | Yasukawa et al. . |

FOREIGN PATENT DOCUMENTS

| | | |
|---|---|---|
| 0036178 | 9/1981 | European Pat. Off. . |
| 0334307 | 9/1989 | European Pat. Off. . |
| 2555650 | 11/1983 | France . |
| 2633660 | 6/1988 | France . |
| 2636027 | 7/1989 | France . |
| 178219 | 8/1986 | Japan ...................... 49/377 |
| WO88/09594 | 1/1988 | PCT Int'l Appl. . |
| 950062 | 7/1960 | United Kingdom . |

*Primary Examiner*—Peter M. Cuomo
*Assistant Examiner*—Jerry Redman
*Attorney, Agent, or Firm*—Leydig, Voit & Mayer

[57] ABSTRACT

A sealing arrangement for a window pane in a vehicle body which can be raised and lowered is shown. The body panel on the outside of the door carries a seal. This seal has an integral hinge region and the inherent resilience of the material biases the seal into a position in which a lip seals against the window pane. When a motor is energised, push rods push upwardly on the end of a leg and hinge the lip away from the window pane, thus permitting it to be easily raised or lowered. This leg is reinforced with a metal strip to enable the force produced by the push rod to be transmitted to the lip. In another embodiment, the lip is hinged away from the window pane by inflation of an air-tube, thus permitting it to be easily raised or lowered. When this air-tube is fully collapsed, the lip moves closer into contact with the window pane, enabling the window pane to be wiped or cleaned as it is moved downwardly.

15 Claims, 6 Drawing Sheets

SEALING ARRANGEMENTS

BACKGROUND OF THE INVENTION

The invention relates to sealing arrangements. More specifically, the invention relates to sealing arrangements for sealing against movable panels such as in motor vehicle bodies. In embodiments of the invention to be described in more detail below, the invention is applied to a movable panel consisting of a slidable window glass in a motor vehicle body.

SUMMARY OF THE INVENTION

According to the invention, there is provided a sealing arrangement for controllably sealing against a panel, comprising a flexible sealing lip, means mounting the flexible sealing lip adjacent the panel, a reinforced member integral with the sealing lip, and sealing lip control means operative when activated to apply a mechanical force to the reinforced member such as to move the sealing lip between first and second positions in which it is respectively out of and in of sealing contact with the panel.

According to the invention, there is also provided a sealing arrangement for sealing against a slidable window glass, comprising a flexible sealing lip, means mounting the flexible sealing lip adjacent the movable window glass, and selectively operable sealing lip control means mounted to apply a controllable mechanical force to the sealing lip to move it selectively into a first position in which it is substantially clear of the window glass, a second position in which it is in sealing contact with the window glass, and a third position in which it contacts the window glass with a greater pressure than in the second position and carries out a wiping action on the window glass as the latter slides.

According to the invention, there is further provided a sealing arrangement for sealing against a slidable window glass, comprising a flexible sealing lip, means mounting the flexible sealing lip adjacent to the slidable window glass, motor means mounted adjacent to the sealing lip, the motor means having an output member which moves in response to energisation of the motor means, and means connecting the output member to the sealing lip whereby movement of the output member moves the sealing lip between first and second positions in which it is respectively out of and in sealing contact with the window glass.

DESCRIPTION OF THE DRAWINGS

Sealing arrangements embodying the invention and for sealing against a slidable window glass in a motor vehicle body will now be described, by way of example only, with reference to the accompanying diagrammatic drawings in which.

DESCRIPTION OF PREFERRED EMBODIMENTS

Figure 1:
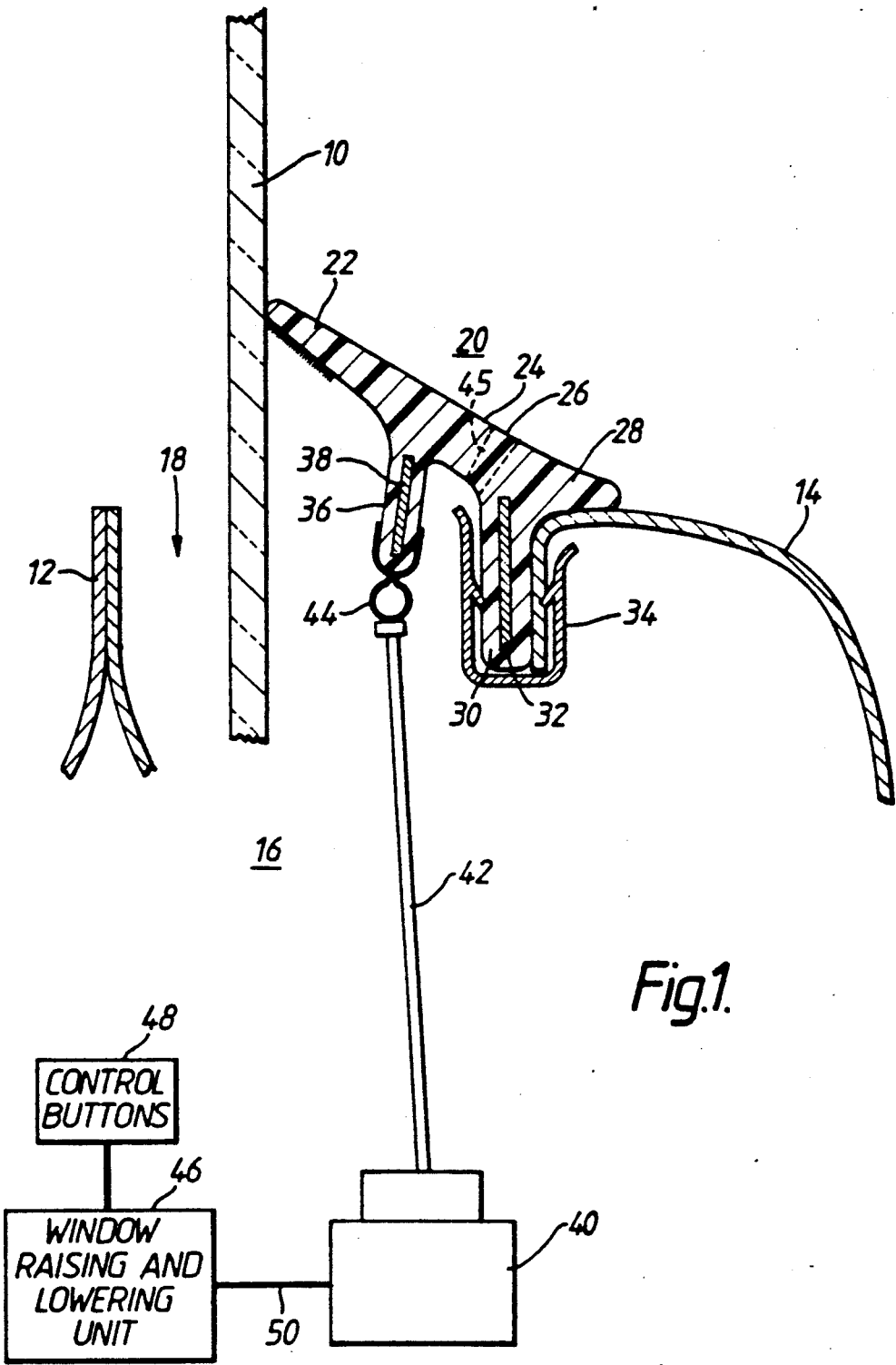
FIG. 1 is a cross-section through one of the sealing arrangements in a sealing configuration.

The sealing arrangements to be described are for sealing against a window pane 10 which can be raised and lowered, such as a window pane in a vehicle body which can be lowered into and raised from the lower part of the door.

The Figures show a cross-section through part of the door to an enlarged scale. The lower part of the door is hollow and is the space between an inner body panel 12 and an outer body panel 14. The window pane 10 can be lowered into the interior 16 of the lower part of the door by means of the normal window winding mechanism which can be manually operated or motorised. The inner and outer body panels 12 and 14 define a gap 18 at the so-called waistline through which the window pane 10 is raised and lowered. It is necessary to provide a flexible sealing arrangement for sealing against the opposite faces of the window pane 10, particularly when the window pane 10 is in its closed (fully raised) position. For this purpose, seals are mounted on the body panels 12 and 14 and run along the length of the gap 18. The seal on the body panel 12 is omitted in the Figures. The Figures show different possible arrangements for the seal on the body panel 14 as will now be described.

Referring to FIG. 1, the seal 20 mounted on the body panel 14 is in the form of a lip 22 which is made of flexible plastics or rubber material and is integral with a body part 24 which may be made of more rigid material. However, the body part 24 incorporates an integral flexible region 26 which acts as a hinge (in a manner to be explained) and integrally connects the body part 24 with a mounting part 28 having a downwardly depending integral leg 30. Leg 30 incorporates a metal reinforcing strip 32 which extends along the waistline. Leg 30 is mounted on the body panel 14 by means of U-shaped clips 34 which are positioned at integrals along the waist line (or the clips 34 may be replaced by a single clip in the form of a continuous channel).

The seal 20 also incorporates an integral second depending leg 36 which includes a reinforcing metal strip 38.

The reinforcing metal strips 32,38 may be continuous unapertured strips of metal or may be apertured with a series of slits or slots to aid flexibility if this is required. Instead, however, the metal strips may be replaced by strips of other hard material such as hardened rubber or plastics. A further possibility is to make the leg 36, and possibly the leg 30 as well, of hardened rubber or plastics. Different parts of the seal can be extruded integrally to have different hardnesses.

The arrangement shown in FIG. 1 also incorporates a motor 40 mounted in the interior 16 of the door. The motor may be of any suitable type, such as electric or pneumatic for example, and is such that, when energised, it raises or lowers a series of push rods of which one is shown in the Figure at 42. Other, similar, push rods are arranged along the waistline, there being four in total, for example, all of them being operated by the same motor 40. The upper end of each push rod is flexibly linked to the distal end of the depending leg 38 by means of a metal clip 44 fitted over the end of the leg as shown.

FIG. 1 shows the seal 20 in the sealing configuration, with its lip 22 sealing against the outer face of the window pane 10. The inherent resilience of the material of the seal holds the lip in close sealing contact with the window pane 10. In this configuration, the window pane 10 is in its closed or fully raised position.

When it is desired to lower the window, the motor 40 is energised either manually or automatically. When energised, the motor 40 raises the push rod 42 and all the other push rods and these therefore push upwardly on the leg 38 and hinge the seal 20 about a pivot axis 45 in the hinge region 26, against the inherent resilience of the material of the seal, thus separating the lip 22 from the face of the window pane 10. The seal thus moves into the non-sealing configuration shown in FIG. 2. The window pane can therefore be easily raised and lowered without any resistance caused by frictional engagement of the lip 22 against it. The motor 40 may be energised in response to operation of the manual or motorised window raising and lowering control. For example, as indicated in FIG. 1, the motorised window raising and lowering unit 46 is controlled by driver's push buttons 48. By means of a connection 50, the motor 40 can be energised in correspondence with raising or lowering of the window glass 10.

When window movement has stopped, either when the window has been fully lowered or at some intermediate position for example, the motor 40 can be de-energised. The push rod 42 and the other push rods now move downwardly, thus causing the lip 22 to be moved back into sealing engagement with the window pane 10 by virtue of the inherent resilience of the seal material.

Figure 2:
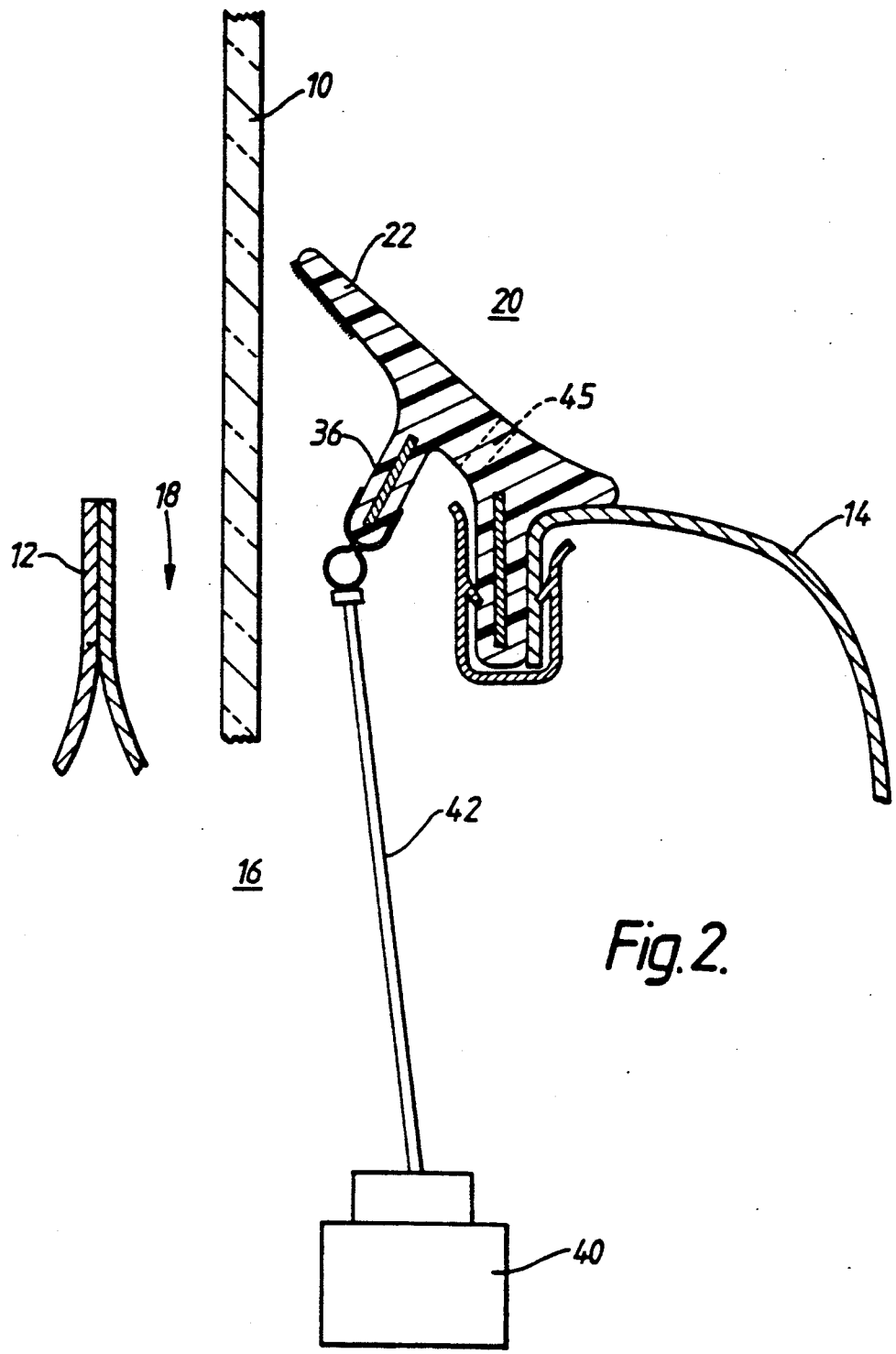
FIG. 2 corresponds to FIG. 1 but shows the sealing arrangement of FIG. 1 in a non-sealing configuration.
Figure 3:
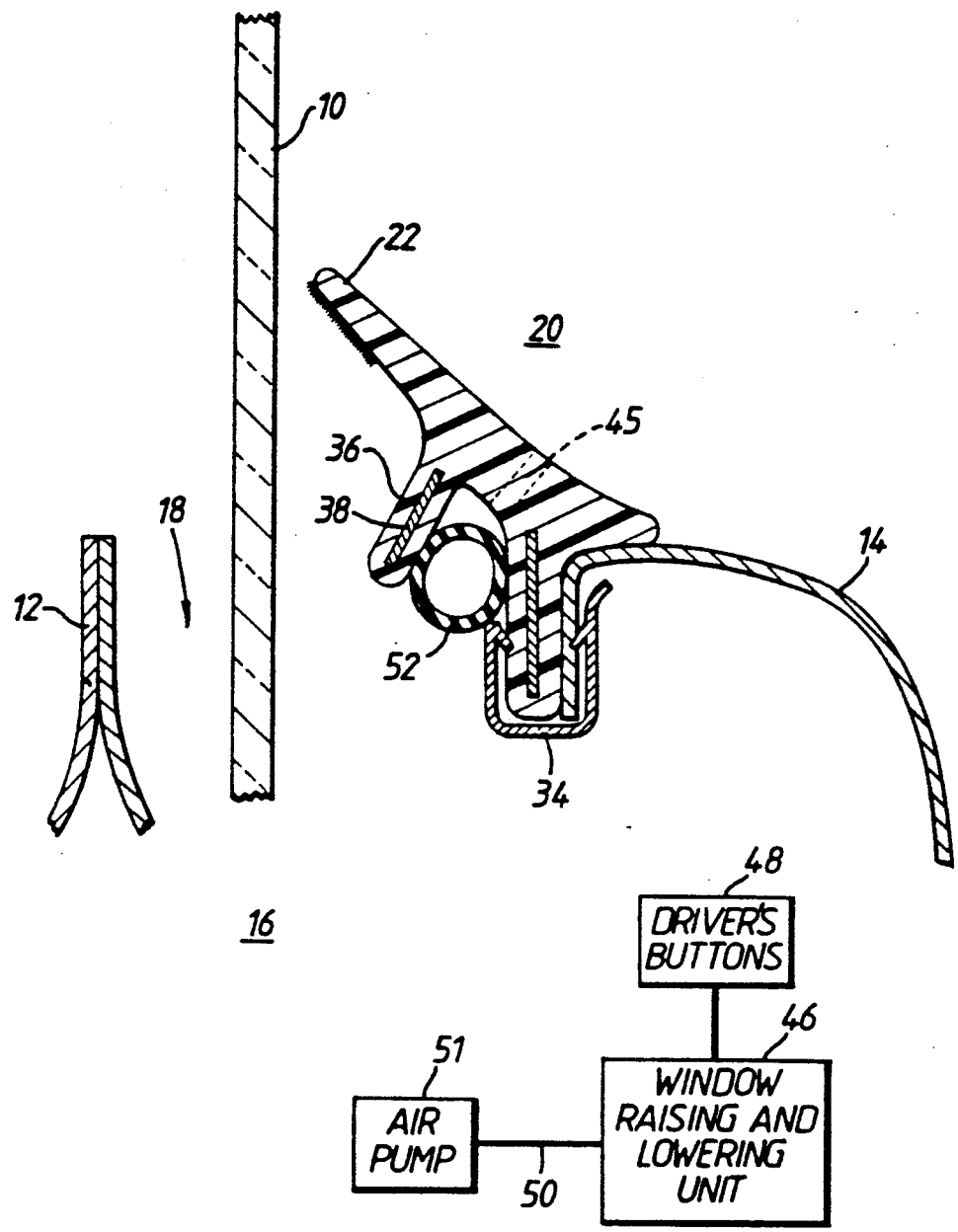
FIG. 3 is a cross-section through another of the sealing arrangements in a non sealing configuration.

Items in FIG. 3 corresponding to those in FIGS. 1 and 2 are correspondingly referenced. It will thus be seen that the construction of the seal 20 in FIG. 3 is basically the same as the seal 20 in FIG. 1. However, the arrangement of FIG. 3 does not use the motor 40 and the push rods for moving the seal into and out of its sealing configuration. Instead, it uses a hollow tube 52 which runs for the length of the waistline and is air tight and held in position between the facing surfaces of the depending legs 30 and 36. The interior of the air tube 52 is connected to a source of air pressure by means of which it can be inflated into the configuration shown in the Figure. In this configuration, the expanded air tube applies a force to the side of the leg 36, causing the body 34 of the seal 20 to hinge against the resilience of the material about the pivot axis 45. The sealing lip 22 is thus moved out of sealing configuration with the window glass. Deflation of the air tube 52 collapses it and the resilience of the material of the seal causes the lip 22 to move back into sealing engagement with the window pane 10. Inflation and deflation of the air tube 52 can be arranged to be controlled manually or automatically. As indicated in FIG. 3, it could for example be controlled automatically in synchronism with raising and lowering of the window, via the driver's push buttons 48 controlling the window raising and lowering unit 46 and a connection 50 from the latter to a pump 51 for controlling the air pressure in the tube 52 (the connection from the pump 51 to the tube 52 is omitted for clarity).

In a modification, the air tube 52 could be connected to a partial vacuum source. Its normal or relaxed shape would be as shown in FIG. 3 (that is, the shape assumed by its inherent resilience) and, in this shape, it would hold the sealing lip 22 away from the window pane. When connected to a source of partial vacuum, however, the air tube would be collapsed so as to move the sealing lip back into sealing engagement with the window pane.

The ends of the air tube 52 would of course be blocked to render the tube air-tight. This will cause extra bulk at the ends and the legs 30,36 or one of them could be shaped to accommodate this bulk.

The metal reinforcements 32 and 38, particularly the reinforcement 38, stabilise the seal 20 across the waist line.

Figure 4:
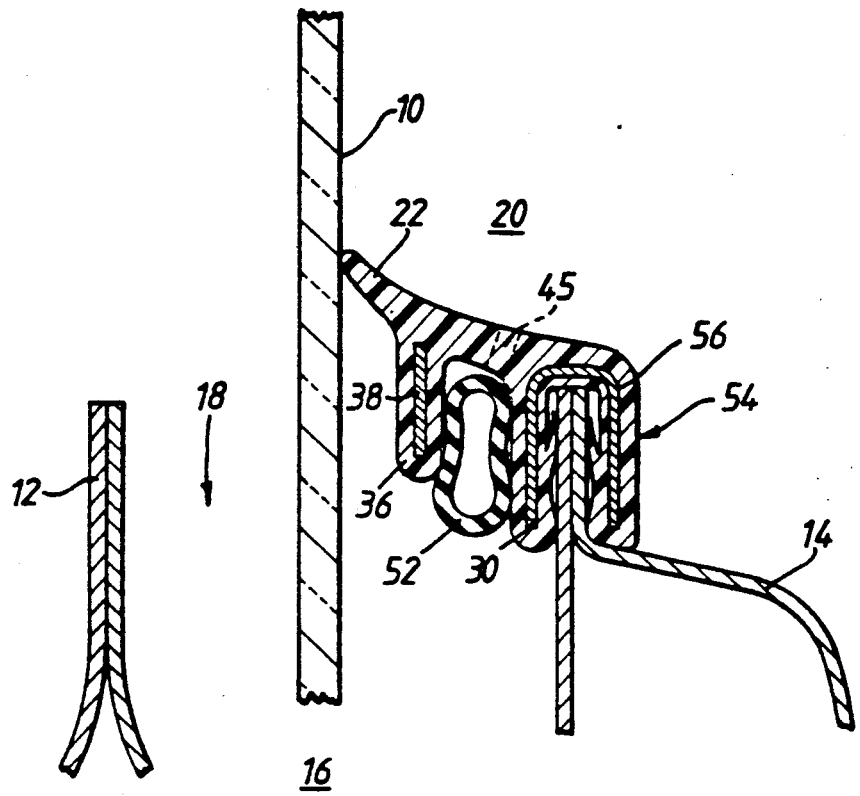
FIG. 4 is a cross-section through a further one of the sealing arrangements in a sealing configuration.
Figure 5:
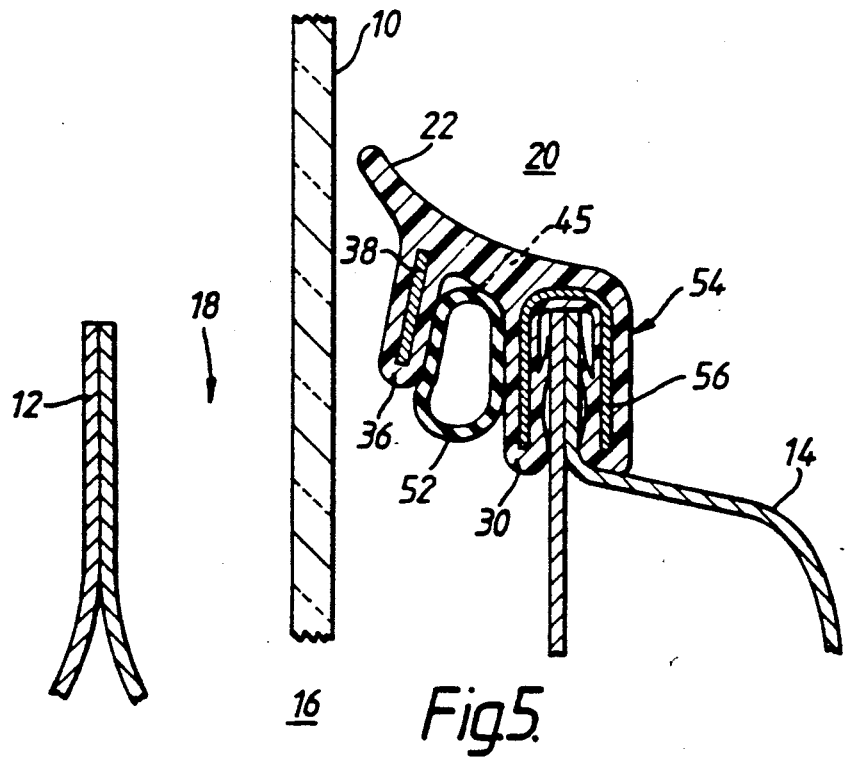
FIG. 5 is a cross-section through the sealing arrangement of FIG. 4, but in a non-sealing configuration.

The metal clips 34 can be omitted and, instead, the leg 30 can be extended to form a channel which embracingly grips the edge of the panel 14. Such an arrangement is shown in FIGS. 4 and 5 in which items corresponding to those in the other Figures are correspondingly referenced. In FIGS. 4 and 5, leg 30 forms one side wall of a channel 54 which is reinforced by a channel-shaped reinforcement 56 and grips the edge of the panel 14 where it is connected to an adjacent panel. FIG. 4 shows the air-tube 52 collapsed with the lip 22 in the sealing position, while FIG. 5 shows the air-tube expanded, thus placing the lip in the non-sealing position. The interior walls of the channel 54 may be formed with lips as shown to help the channel grip the panels.

Figure 6:
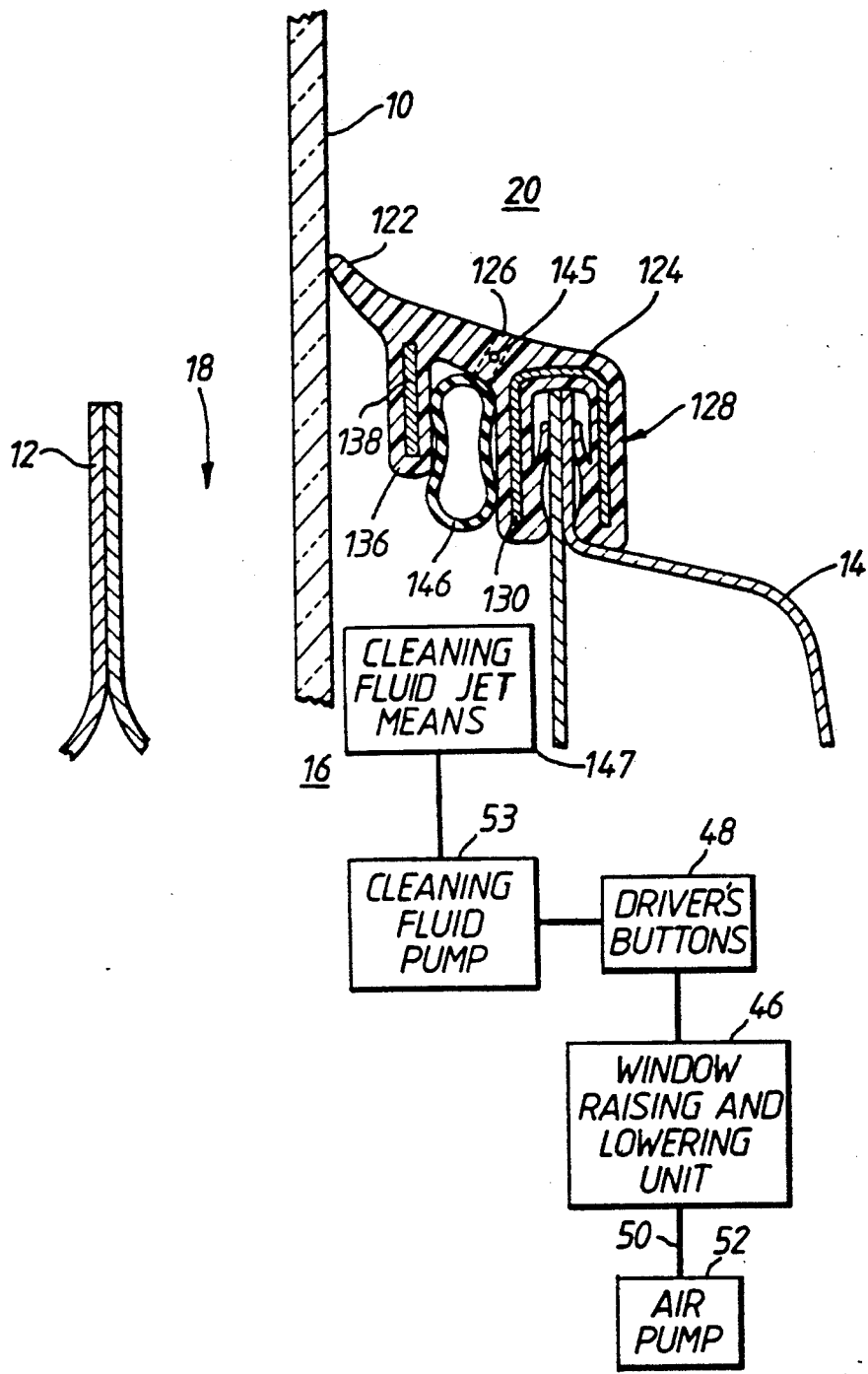
FIG. 6 is a cross-section through yet a further one of the sealing arrangements, in a sealing configuration.

Referring to FIG. 6, the seal 20 mounted on the body panel 14 is in the form of a lip 122 which is made of flexible plastics or rubber material and is integral with a body part 124 which may be made of more rigid material. However, the body part 124 incorporates an integral flexible region 126 which acts as a hinge (in a manner to be explained) and integrally connects the body part 124 with a mounting part 128 in the form of a channel which is reinforced with a metal channel-shaped carrier 130 of any suitable form. Part 128 is mounted on the body panel 14 by frictionally embracing it, lips within the part 128 helping this frictional grip. Other fixing means may, however, be used instead.

The seal 20 also incorporates an integral depending leg 136 which includes a reinforcing metal strip 138. The reinforcing metal strip 138 may be a continuous unapertured strip of metal or may be apertured with a series of slits or slots to aid flexibility if this is required. Instead, however, the metal strip may be replaced by strips of other hard material such as hardened rubber or plastics. A further possibility is to make the leg 36 of hardened rubber or plastics. Different parts of the seal can be extruded integrally to have different hardnesses.

As shown in FIG. 6, a hollow tube 146, which runs for the length of the waistline and is air tight, is held in position between the facing surfaces of part 128 and the depending leg 136. The interior of the air tube 146 is connected to a source of air pressure by means of which its shape can be controlled. When the tube has the shape shown in FIG. 6, lip 122 is in sealing contact with the window pane. In this configuration, the window pane is in its fully closed position.

Figure 7:
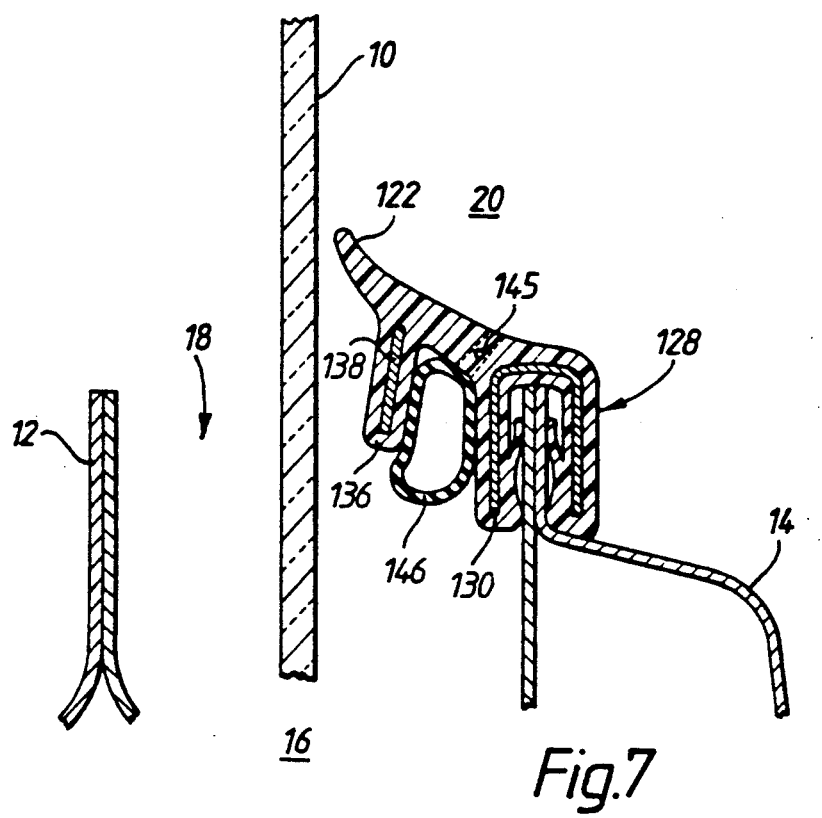
FIG. 7 corresponds ti FIG. 6 but shows the arrangement of FIG. 6 in a non-sealing configuration.

When it is desired to lower the window pane, either manually or automatically, the tube 146 is inflated by air pressure into the configuration shown in FIG. 7. In this configuration, the expanded air tube applies a force to the side of the leg 136, causing the body 134 of the seal 20 to hinge against the resilience of the material about the pivot axis 145. The sealing lip 122 is thus moved out of sealing configuration with the window glass. Deflation of the air tube 146 collapses it and the resilience of the material of the seal causes the lip 122 to move back into sealing engagement with the window pane 10 as shown in FIG. 6.

Figure 8:
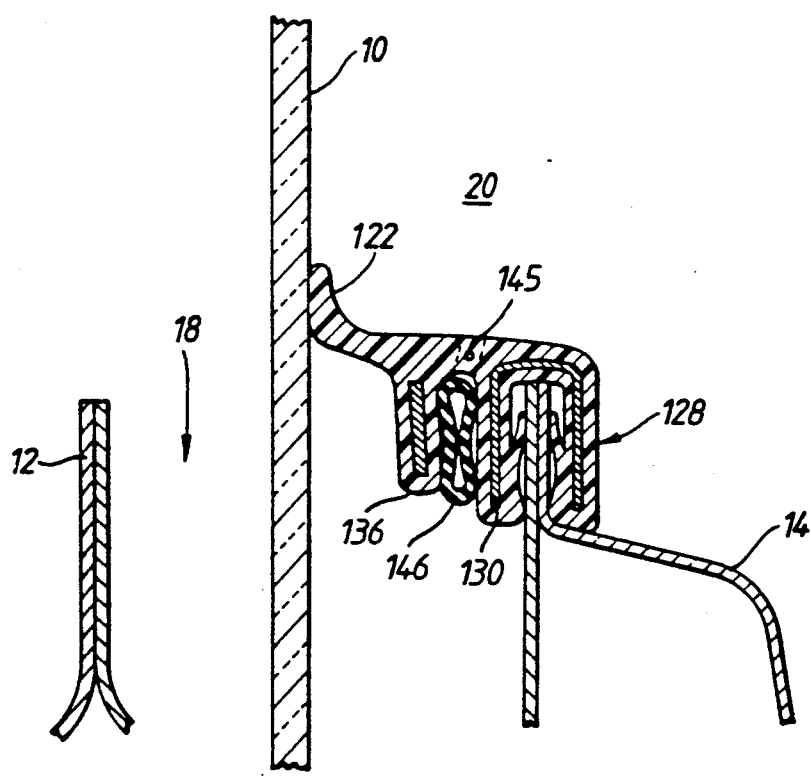
FIG. 8 corresponds to FIG. 6 but shows the arrangement in a wiping configuration.

FIG. 8 shows the configuration which is assumed when the air-tube 146 is collapsed to a greater degree than shown in FIG. 6. In this configuration, the lip 122 is forced into closer contact with the window pane than in FIG. 1 and is able to carry out a wiping or cleaning action on the window pane by causing the window pane to be moved downwards (or possibly upwards) with the lip held in this position. Means (147, see FIG. 6) may be provided for applying a jet of cleaning fluid to the window pane to aid this process.

Movement of the lip 122 between the positions shown in FIGS. 6, 7 and 8 can be controlled manually, by means of a driver's switch controlling an air pump or automatically in dependence on the operation of the window raising and lowering unit. FIG. 6 shows the window raising and lowering unit 46 controlled by the driver's push buttons 48. By means of a connection 50, an air pump 51, controlling the air pressure in the tube 146 by means of a connection not shown, can be operated so as to move the lip 122 into the FIG. 7 position when the window is raised or lowered and then to move back into the FIG. 6 position when the window movement stops. By means of a further push button, the driver can cause the lip 122 to move into the FIG. 8 position when the driver desires to wipe the window. Another of the buttons can be operated by the driver to energise a cleaning fluid pump 53 operating the cleaning fluid jet means 147, or the pump could be operated automatically when the lip 122 moves into the FIG. 8 position.

Instead of an air pressure source, a source of partial vacuum may be used to control the shape of the air-tube 146 against its natural resilience.

What is claimed is:

1. A sealing arrangement for controllably sealing against a window glass slidable in a predetermined path, comprising
   a sealing lip made of flexible material and defined by a first portion of the material,
   a support positioned alongside the predetermined path,
   means connecting the sealing lip to the support for mounting the sealing lip adjacent the predetermined path,
   a second portion of the flexible material depending transversely from the first portion thereof,
   a reinforcing member embedded in the second portion of the flexible material so as to render it relatively rigid,
   controllable mechanical force-producing means in contact with the second portion of the flexible material and operative when activated to apply a mechanical force to the second portion of the flexible material which force to the second portion of the flexible material which force is transmitted by the second portion to the first portion of the flexible material such as to move the sealing lip between first and second positions in which it is respectively out of and in sealing contact with the window glass, the flexible material having inherent resilience which biases the sealing lip into one of the first and second positions, the mechanical force moving the sealing lip into the other of the first and second positions,
   the mechanical force-producing means being capable when additionally activated to produce a further mechanical force on the second portion of the flexible material so as to move the sealing lip past the said second position into a third position in which it is in enhanced contact with the window glass, whereby to wipe the latter as the glass slides, and
   sealing lip control means operable independently of sliding movement of the window glass to activate the mechanical force-producing means.

2. A sealing arrangement according to claim 1, in which the mechanical force-producing means comprises motor means having an output member which moves when the motor means is energised thereby to produce the mechanical force, the output member being in contact with the second portion of the flexible material.

3. A sealing arrangement according to claim 2, in which the motor means is pneumatic.

4. A sealing arrangement according to claim 1, in which the mechanical force-producing means comprises means defining a fluid pressure chamber positioned adjacent and in contact with the second portion of the flexible material, and in which the sealing lip control means comprises means for varying the pressure within the air chamber so as to produce the said force.

5. A sealing arrangement according to claim 4, in which the second portion of the flexible material defines one wall of a channel in which the means defining the fluid pressure chamber is situated such that change in fluid pressure in the chamber causes distortion of the shape of the channel.

6. A sealing arrangement according to claim 5, in which
   the second portion of the flexible material constitutes one side wall of the channel,
   an opposite side wall of the channel is substantially rigid and is defined by the said support, and
   the channel has a base constituted by an extension of the first portion of the flexible material which extension includes a portion of enhanced flexibility to produce a hinge about which the base of the channel pivots when the channel undergoes the said distortion, thereby moving the sealing lip between its two said positions.

7. A sealing arrangement according to claim 1, in which the flexible material is extruded plastics or rubber material.

8. A sealing arrangement according to claim 1, including cleaning fluid jet means operative when activated to apply cleaning fluid to the window glass.

9. A sealing arrangement according to claim 1, including cleaning fluid jet means operative when activated to apply cleaning fluid to the window glass, and means operative to activate the cleaning fluid jet means when the sealing lip is moved into the said third position.

10. A sealing arrangement according to claim 1, in which the inherent resilience of the flexible material biases the sealing lip into the third position, and in which the said mechanical force moves the sealing lip from the third position to the second position and from the second position to the first position.

11. A sealing arrangement for sealing against a window glass which is slidable along a predetermined path, comprising
    flexible material defining a single sealing lip, means mounting the sealing lip adjacent the movable window glass, mechanical force-producing means mounted to apply a controllable mechanical force to the sealing lip to move it selectively into a first position in which it is substantially clear of the window glass, a second position in which it is in sealing contact with the window glass, and a third position in which it contacts the window glass with a greater pressure than in the second position and carrier out a wiping action on the window glass as the latter slides, and selectively operable sealing lip control means connected to control the mechanical force-producing means such that the mechanical force-producing means moves the sealing lip into any selected one of the said positions.

12. A sealing arrangement according to claim 11, in which the sealing lip has inherent resilience biasing it into the said third position, and in which the mechanical force-producing means comprises means for applying the said force to the sealing lip in opposition to the resilience of the flexible 13. A sealing arrangement according to claim 11, in which the mechanical force-producing means comprises a flexible fluid pressure chamber, means for mounting the chamber adjacent to the sealing lip such that changes in the shape of the chamber move the sealing lip, and means for controllably altering the fluid pressure within the chamber so as to change its shape and thereby generate the said force and move the sealing lip.

14. A sealing arrangement according to claim 13, in which the sealing lip is hingeably mounted, and including a reinforced leg attached to and depending from the sealing lip so as to define at least part of wall means forming a channel, and in which the said fluid pressure chamber is mounted within the said channel.

15. A sealing arrangement according to claim 11, including window glass control means for causing sliding movement of the window glass, and means interconnecting the window glass control means with the sealing lip control means so that the sealing lip control means causes the mechanical force-producing means to move the sealing lip into the first position when the window glass slides.

* * * * *